United States Patent [19]

Inoue et al.

[11] Patent Number: 4,920,053

[45] Date of Patent: * Apr. 24, 1990

[54] METHOD FOR MICROMANIPULATING CELLS BY MOVING CELL-CONTAINING VESSEL ON STAGE OF INVERTED MICROSCOPE WHILE PRICKING CELLS WITH TIP OF STYLUS

[75] Inventors: Yasuo Inoue; Itaru Endo, both of Hachiouji, Japan

[73] Assignee: Olympus Optical Co., Ltd., Tokyo, Japan

[ * ] Notice: The portion of the term of this patent subsequent to Aug. 9, 2005 has been disclaimed.

[21] Appl. No.: 190,814

[22] Filed: Apr. 28, 1988

Related U.S. Application Data

[63] Continuation of Ser. No. 42,519, Apr. 27, 1987, Pat. No. 4,762,405, which is a continuation of Ser. No. 717,091, Mar. 28, 1985, abandoned.

[30] Foreign Application Priority Data

Mar. 29, 1984 [JP] Japan ................................ 59-061769

[51] Int. Cl.⁵ ........................ G12M 1/00; G02B 21/32
[52] U.S. Cl. .................................... 435/240.1; 935/53; 350/507; 350/524
[58] Field of Search ........................ 435/240.1; 935/53; 350/507, 509, 518, 520, 521, 529, 530, 531, 237–244

[56] References Cited

U.S. PATENT DOCUMENTS

| 1,129,742 | 2/1915 | Sheaff | 350/507 |
| 4,128,944 | 12/1978 | Stanton | 350/515 |
| 4,270,838 | 6/1981 | Furusawa et al. | 350/525 |
| 4,601,551 | 7/1986 | Pettingell et al. | 350/525 |
| 4,626,906 | 12/1986 | Ensor | 350/508 |
| 4,749,270 | 6/1988 | Endo et al. | 350/530 |
| 4,762,405 | 8/1988 | Inoue et al. | 350/507 |

FOREIGN PATENT DOCUMENTS

| 4411235 | 5/1969 | Japan | 350/529 |
| 2022287 | 8/1982 | United Kingdom . | |

Primary Examiner—Jon W. Henry

[57] ABSTRACT

An inverted-design microscope provided with a micromanipulator so as to be movable along the optical axis in interlocking with the movement of the objective lens for focusing pricking in order that the micromanipulator may be operated minutely and simply on an object to be observed without preventing the illuminating system from being attached, detached, replaced or switched. The micromanipulator is so formed as to be able to prick the object along the optical axis of the objective lens in such a manner that the tip part of a stylus of the micromanipulator is always arranged slightly above a focus position of the objective lens.

1 Claim, 3 Drawing Sheets

METHOD FOR MICROMANIPULATING CELLS BY MOVING CELL-CONTAINING VESSEL ON STAGE OF INVERTED MICROSCOPE WHILE PRICKING CELLS WITH TIP OF STYLUS

This is a division of our application Ser. No. 042,519, filed Apr. 27, 1987 (now U.S. Pat. No. 4,762,405), which was a continuation of our application Ser. No. 717,091, filed Mar. 28, 1985 (abandoned).

BACKGROUND OF THE INVENTION (a) Field of the Invention

This invention relates to microscopes and more particularly to an inverted-design microscope provided with a micromanipulator.

(b) Description of the Prior Art

There is already known such inverted-design microscope of this kind as is mentioned, for example, in Japanese patent publication No. 53925/1982. Therein, as shown in FIG. 1, a micromanipulator 2 is integrally incorporated in the condenser lens 1 of a microscope so that, when the micromanipulator 2 is vertically moved along the optical axis of the objective lens 3, its tip part will be thrust into a cell within a cultivating vessel 5 mounted on a stage 4. Recently, the object of such cell manipulation has come to be minute. Such manipulation as, for example, of discriminating the colors of a nucleus derived from an ovum wihtin a fertilized cell of a mouse and a nucleus derived from a spermatozoon and sucking only the nucleus derived from the ovum is carried out under the differential interference observation from the viewpoint of the resolving performance. In the case of setting the above mentioned micromanipulator 2 or manipulating egg cells of a cow, a comparatively low magnification is often used. Therefore, in the case of switching the magnification or switching to the differential interference observation system, it is necessary to attack, detach, replace or switch the illuminating system, that is, the condenser lens. However, in the above mentioned conventional structure, as the micromanipulator 2 is integrally attached to the condenser lens 1, the illuminating system, that is, the concenser lens 1 has not been able to be easily attached, detached, replaced or switched.

Also, there is known an inverted-design microscope provided with a micromanupulator of the formation shown in FIG. 2. In FIG. 2, the reference numeral 10 represents a stage of the microscope, 11 represents a cultivating vessel mounted on the stage 10 and containing cells 11a, 12 represents a condenser lens including a ring slit 12a wihtin, 13 represents an objective lens attached to a revolver 14 and having a phase plate 15 within and 16 represents a micromanipulator fixed to the stage 10 (or to a part of the microscope body near the stage 10) through a attaching tool 17 and having its glass stylus 16a extended to the cell 11a within the caltivating vessel 11, that is, to the vicinity of the focus position of the microscope. In the thus formed inverted-design microscope, in the case of carrying out a so-called pricking technique, for example, of thrusting the glass stylus 16a of the micromanipulator 16 by an operating handle 16c into the cell 11a within the caltivating vessel 11 to impregnate the cell with enzyme in the caltivating liquid, firstly, the glass stylus 16a is positioned near the upper surface of the cell by using manipulation handles 16c, 16d, 16e under the close observation by the eye and/or the objective lens and is thrust into cell 11a by the manipulation handle 16e. Next, the glass stylus is carefully raised far enough not to break it by the manipulation handle 16c, and the caltivating vessel 11 is moved to enable to thrust the glass stylus 16a into the next cell in the caltivating vessel 11. This is usually done by operator's fingers. If, however, this is done by a sample stage handle of the microscope, the operation is much complicated because the above mentioned first step must be repeated. Therefore, in the prior art limited to treat, for example, about 500 cells per hour and, as the bottom surface of the caltivating vessel or particularly of a plastic vessel is not flat and the growth of the cells does not expand uniformly along the bottom surface of the caltivating vessel, the positions in the optical axis direction of the respective cells will be different, thus the focus will deviate in moving the stage 10 in the horizontal direction, therefore it will be necessary to make a two-step operation, that is, to make focusing with a focusing handle and then to operate the respective operating parts of the micromanipulator 16 so as to bring its glass stylus 16a to the vicinity of the focus position and therefore the manipulation will be very complicated.

SUMMARY OF THE INVENTION

In view of the above description, a primary object of the present invention is to provide an inverted-design microscope provided with a micromanipulator wherein various minute manipulations can be made on an object to be observed.

According to the present invention, this object is attained by a formation wherein a micromanipulor is so arranged as to move vertically in interlocking with the movement of an objective lens with a focusing handle of the microscope for focusing and pricking in the optical axis direction of the objective lens.

According to a preferred formation of the present invention, the micromanipulator is made movable at least in the vertical direction with respect to the objective lens aside from the interlocking with the objective lens by a handle.

According to the present invention, as the micromanipulator is not incorporated in the condenser lens, the illuminating system or particularly the condenser lens can be easily replaced or switched to accompany switching to a phase contrast microscopy or to a differential interference microscopy which is important, for example, to the genic operation. Once the tip part of the glass stylus of the micromanipulator is set slightly above the focus position, that is, still within the focal depth, the tip part of the glass stylus will be always in the visual field of a eyepiece during a pricking operation, therefore a minute manipulation will be able to be made very efficiently, for example, about 1000 to 2000 cells. For example, even in case the bottom part of the caltivating vessel is not flat, if focusing is performed in accordance therewith, the stylus is inevitably moved in a proper position for the pricking operation and is continuously moved by the same focusing handle to prick the cell brought into the proper position and therefore it is not necessary to perform a two-step operation of focusing followed by stylus setting. Accordingly, the manipulation is performed efficiently, even if the bottom part of the caltivating vessel is not flat.

DESCRIPTION OF THE PREFERRED EMBODIMENTS

Figure 1:
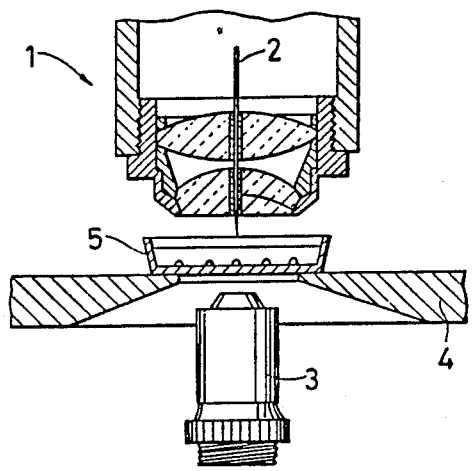
FIG. 1 and 2 are views each showing a conventional inverted-design microscope provided with a micromanipulator.
Figure 2:
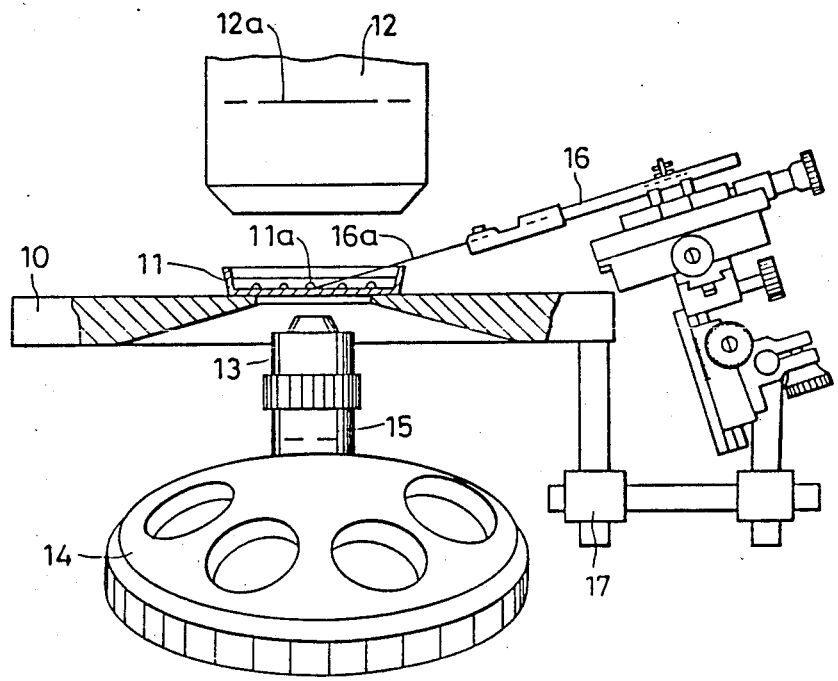
Figure 3:
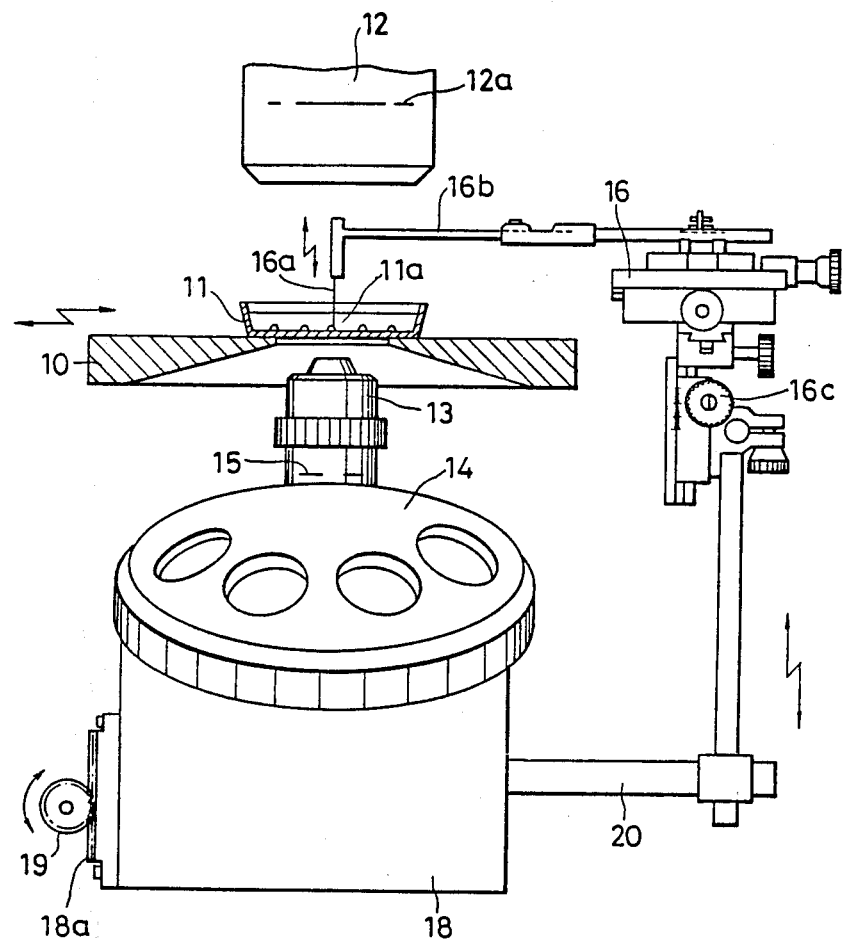
FIG. 3 is a view showing an embodiment of the inverted-design microscope according to the present invention.

The present invention shall be explained in the following with the embodiment shown in FIG. 3. The same reference numerals shall be attached to the same respective components as of the conventional example in FIG. 2 and shall not be explained. The reference numeral 18 represents a revolver holding base pivotally supporting a revolver 14 and made to move vertically for focusing by the cooperation of a rack 18a secured to said revolver holding base 18 and a pinion 19 rotated by the operation of a vertically moving handle provided on the microscope body but not illustrated. In the case of this embodiment, the micromanipulator 16 is fixed to the revolver holding base 18 through an attaching tool 20, the glass stylus 16a is attached to the body of the micromanipulator through a T-shaped arm 16b and the tip part is positioned within the focal depth of the focus position focused to the cell 11a within the caltivating vessel 11.

As the embodiment of the present invention is formed as in the above, for example, in the case of carrying out the above described pricking operation of thrusting the glass stylus 16a into the cell 11a to impregnate the cell with the enzyme in the caltivating liquid, when, first, the vertically moving handle not illustrated of the microscope body is operated to rotate the pinion 19 to vertically move the revolver holding base 18 to thereby focus the cell 11a to be pricked within the caltivating vessel 11, the vertically moving handle 16c of the micromanipulator 16 is operated to set the tip part of the glass stylus 16a of the micromanipulator 16 slightly above the cell 11a, that is, within the focal depth and then the vertically moving handle of the microscope body is operated to move the revolver holding base 18 slightly downward, by the downward movement of the revolver holding base 18, the glass stylus 16a of the micromanipulator 16 will also move downward in interlocking with it and will thrust the cell 11a to prick it. If the vertically moving handle of the microscope body is then returned to the original position, both of the revolver holding base 18 and micromanipulator 16 will return to the respective positions. If the stage 10 is then moved in the horizontal direction, the cell to be pricked next will be brought onto the optical axis of the microscope and the same operation will be made again to prick the cell. By the way, generally, the bottom surface of the caltivating vessel is not flat enough, the growth of the cells within the caltivating vessel does not uniformly expand along the bottom surface of the caltivating vessel and therefore the positions in the optical axis direction of the respective cells are different. However, according to the above mentioned embodiment, when the vertically moving handle of the microscope body is operated to vertically move the revolver bolding base 18 to focus the object, the micromanipulator 16 will move vertically in interlocking with the vertical movement of the revolver holding base 18 and the tip part of the glass stylus 16a will be always slightly above the focus position, that is, within the focal depth. Therefore, even if the position in the optical axis direction of the cell is different, by focusing the object with the vertically moving handle of the microscope, the object will be brought into focus area along with the tip part of the glass stylus 16a so as to be able to see in the visual field of an eyepiece or into the proper position. Also, by utilizing a ring slit 12a arranged in the front side focus position of the condenser lens 12 and a phase plate 15 arranged in the rear side focus position of the objective lens 13, a phase contrast microscopy can be made.

Figure 4:
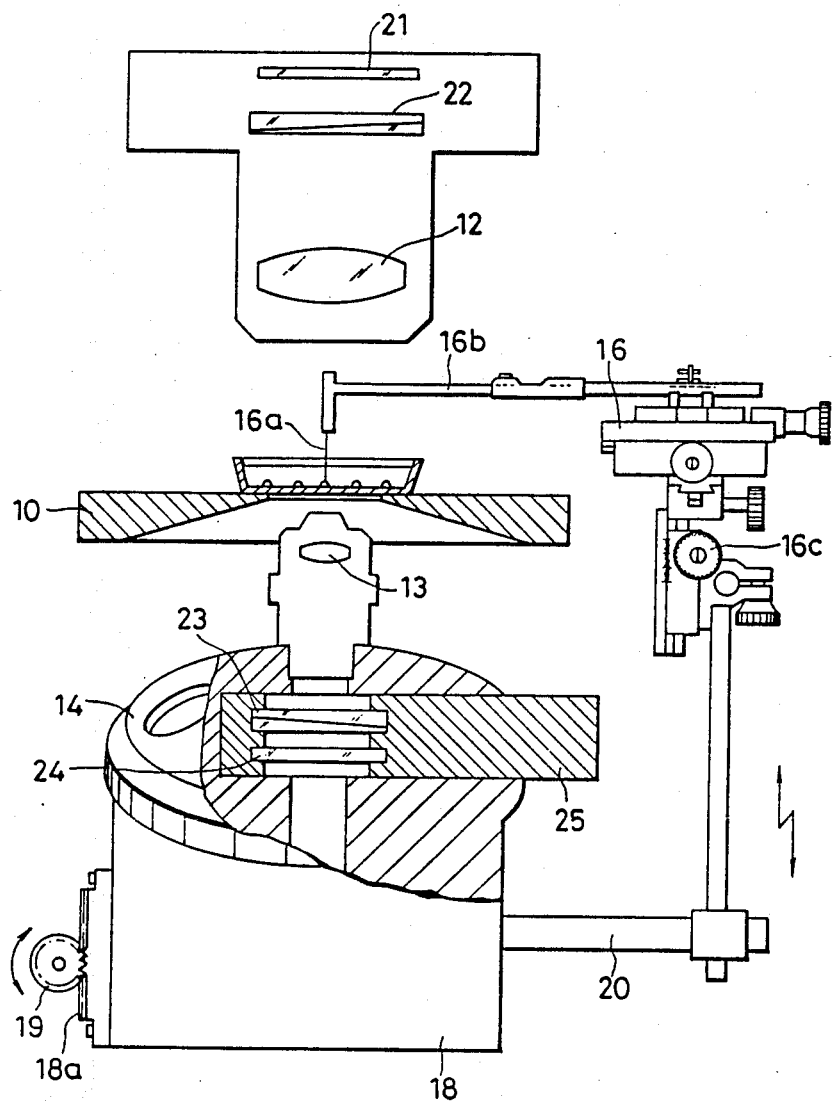
FIG. 4 is a view showing another embodiment of the present invention.

Further, FIG. 4 shows an embodiment in the case of performing a differential interference microscopy. The reference numerals 21 and 22 represent respectively a polarizer and Nomarski prism incorporated in the lens tube of the condenser lens 12. The reference numerals 23 and 24 represent respectively a Nomarski prism and analyzer incorporated integrally in an attackment arranged in the rear of the objective lens 13. The other formations are the same as in the embodiment in FIG. 3. According to this formation, the illuminating light will pass through the polarizer 21 and Nomarski prism 22, will then illuminate the cell 11a within the caltivating vessel 11 through the condenser lens 12, will pass through the Nomarski prism 23 and analyzer 24 within the attachment 25 through the objective lens 13 and will be led to the observing eyepiece system. Therefore, the minute structure of the cell 11a within the caltivating vessel 11 will be observed as an interference image having an interference constrast and a three-dimensional sense resembling the relief effect of shadowing, for example, in an electronic microscope. Thus, this formation is advantageous particularly in respect of the brightness, resolving power and contrast in the case of such manipulation as of injection into the front nucleus part of the cell.

By the way, in the above explanation, the case of the manipulation of pricking the cells within the cultivating vessel mounted on the stage has been described. It is needless to say that the present invention can be applied to an inverted-design microscope provided with a micromanipulator not only for the above described manipulation but also for various minute manipulations on the objects to be observed mounted on the stage. The micromanipulator is fixed directly to the revolver supporting base but may be attached to any other member 25 and may be so formed as to be interlocked with the vertical movement in the optical axis direction for focusing of the revolver supporting base or the objective lens.

What is claimed is:

1. A method of a micromanipulation of some cells by pricking said cells with the tip of stylus under an inverted microscope for observation, comprising:
   supporting some cells within a vessel placed on a stage of an inverted microscope;
   supporting a stylus by an adjustable-length arm attached to an objective holder provided as a revolver on which at least one objective is mounted, so that said stylus is positioned above a respective said objective selected for observation in focus, by adjusting the length of said arm along the optical axis of said objective; and
   driving said objective holder to move vertically toward said cells for focusing and pricking of a sample, while moving said vessel to locate said cells consecutively one by one under said stylus.

* * * * *